United States Patent
Heinrici et al.

(10) Patent No.: US 12,275,084 B2
(45) Date of Patent: Apr. 15, 2025

(54) DYNAMIC BEAM DEFLECTION AND SHAPING FOR LASER PROCESS

(71) Applicant: II-VI Delaware, Inc, Wilmington, DE (US)

(72) Inventors: Axel Heinrici, Kleinmachnow (DE); Paul Sonntag, Berlin (DE); Patrick Kühl, Berlin (DE); Rutger Wevers, Berlin (DE); Matthias Waschicek, Wilmington, DE (US)

(73) Assignee: II-VI DELAWARE, INC., Wilmington, DE (US)

( * ) Notice: Subject to any disclaimer, the term of this patent is extended or adjusted under 35 U.S.C. 154(b) by 120 days.

(21) Appl. No.: 17/382,647

(22) Filed: Jul. 22, 2021

(65) Prior Publication Data

US 2022/0063017 A1  Mar. 3, 2022

Related U.S. Application Data

(63) Continuation-in-part of application No. 17/001,920, filed on Aug. 25, 2020, now Pat. No. 12,162,093.

(51) Int. Cl.
*B23K 26/06* (2014.01)
*B23K 26/082* (2014.01)
*B23K 26/26* (2014.01)

(52) U.S. Cl.
CPC ........ *B23K 26/0648* (2013.01); *B23K 26/082* (2015.10); *B23K 26/26* (2013.01)

(58) Field of Classification Search
CPC ........ B23K 26/00; B23K 26/24; B23K 26/26; B23K 26/082; B23K 26/0648;
(Continued)

(56) References Cited

U.S. PATENT DOCUMENTS 5,877,494 A * 3/1999 Larsen ............... H04N 1/047
                                                250/234
5,923,473 A * 7/1999 Kelley ............. H04N 1/0408
                                                359/823
(Continued)

FOREIGN PATENT DOCUMENTS

DE   112007001944 A5   5/2009
DE   102011117607 A1   5/2013
(Continued)

OTHER PUBLICATIONS

Burge, et al., An Easy Way to Relate Optical Element Motion to System Pointing Stability, Current Developments in Lens Design and Optical Engineering VII, Proc. SPIE, 2006, 6288, 12 pages.
(Continued)

*Primary Examiner* — Steven W Crabb
*Assistant Examiner* — Alba T Rosario-Aponte
(74) *Attorney, Agent, or Firm* — Blank Rome LLP

(57) ABSTRACT

A laser processing head for a laser beam uses actuators engaged with a delivery fiber end to deflect the fiber end relative to an optical axis. The laser beam from the fiber end is collimated by a collimator and is then focused by a focusing lens disposed in the head beyond the collimator to a focal point. The focal point of the laser beam is deflected from the optical axis in relation to the deflection of the fiber end. The fiber end and the actuators are housed in a sealed module. Deflection of the laser beam can be sensed by reflecting portion of the laser beam to a sensing element so a control system can monitor and control the fiber end's movement.

20 Claims, 12 Drawing Sheets

(58) Field of Classification Search
CPC .. B23K 26/073; B23K 26/0876; B23K 26/06; B23K 26/046; B23K 26/042; B23K 26/032; B23K 26/035
USPC .............. 219/121.8, 121.79, 121.78, 121.75, 219/121.73, 121.61, 121.6, 121.63
See application file for complete search history.

(56) References Cited

U.S. PATENT DOCUMENTS

| | | | |
|---|---|---|---|
| 7,408,687 B2 | 8/2008 | Lizotte | |
| 9,261,702 B2 | 2/2016 | Chan | |
| 2007/0091411 A1* | 4/2007 | Mori | G02F 1/37 359/239 |
| 2008/0019702 A1 | 1/2008 | Shibatani et al. | |
| 2010/0296184 A1* | 11/2010 | Shibatani | G02B 7/005 310/317 |
| 2012/0092740 A1* | 4/2012 | Kimura | G02B 26/127 359/204.1 |
| 2012/0320347 A1* | 12/2012 | Morikuni | G02B 13/12 353/101 |
| 2015/0135703 A1 | 5/2015 | Eddington et al. | |
| 2016/0228988 A1 | 8/2016 | Dallarosa et al. | |
| 2017/0192168 A1* | 7/2017 | Grobnic | B23K 26/355 |
| 2019/0384183 A1* | 12/2019 | Yang | G03F 7/706 |
| 2020/0376594 A1 | 12/2020 | Grapov et al. | |
| 2021/0162539 A1 | 6/2021 | Kayahara et al. | |

FOREIGN PATENT DOCUMENTS

| | | |
|---|---|---|
| DE | 102012108214 A1 | 3/2014 |
| DE | 102013102442 A1 | 9/2014 |
| DE | 102014210119 A1 | 12/2015 |
| DE | 102019108084 A1 | 10/2019 |
| EP | 0723834 | 7/1996 |
| WO | WO-03023521 A1 | 3/2003 |
| WO | WO-2008019681 A1 | 2/2008 |
| WO | WO-2020050379 A1 | 3/2020 |
| WO | WO-2020115110 A1 | 6/2020 |

OTHER PUBLICATIONS

"Zoom Fiber Collimators. Technical Data Sheet, THORLABS URL: https://www.thorlabs.com/newgrouppage9.cfm?objectgroup_id=8642 [abgerufen am Aug. 8, 2024]".

* cited by examiner

DYNAMIC BEAM DEFLECTION AND SHAPING FOR LASER PROCESS

CROSS-REFERENCE TO RELATED APPLICATIONS

This is a continuation-in-part of U.S. application Ser. No. 17/001,920 filed 25 Aug. 2020 and entitled "High Leverage Beam Wobbling," which is incorporated herein by reference.

FIELD

The present disclosure generally relates to optical systems and related techniques for use of the same. More particularly, but not exclusively, the present disclosure relates to systems and methods for inducing wobbling into a laser beam.

BACKGROUND OF THE DISCLOSURE

Unless otherwise indicated herein, the materials described herein are not prior art to the claims in the present application and are not admitted to be prior art by inclusion in this section.

In certain applications such as laser cutting, machining, welding or the like, the laser beam may be moved relative to an article onto which the laser beam is directed. For example, the laser beam is moved relative to the article so the laser beam can contact more surface area of the article. In one form, the movement of the laser beam may be accomplished by inducing a wobble to the laser beam so that the laser beam contacting the article is oscillated and creates a wider track width as the laser beam is moved along the article. In other words, the track width from the oscillated laser beam is wider than the laser beam itself in the absence wobbling. In laser cutting applications, the laser beam can be scanned in (and perpendicular) to the feed direction.

In laser welding processes, a fast movement on top of the normal movement of the laser beam relative to the articles or components being joined may be desired. For example, the laser beam as directed on the seam between the components may have a diameter 0.2 to 0.3 mm diameter without wobbling. However, the laser beam may be oscillated at a frequency of 200 to 500 Hz transverse to the feed direction in such a way that a track width of 0.6 to 1 mm is created. In these processes, wobbling of the laser beam creates a wider track width that reduces spattering, facilitates bridging gaps, and allows slower welding speeds. In turn, this process may allow greater welding depths using moderate laser power.

In certain systems, a scanner determines a weld path along the seam between one or more articles or components to be joined, and controls movement of the laser beam along the weld path. The scanner may implement beam wobbling by generating a superimposed wobble pattern when determining the motion path of the laser that follows the seam geometry. However, using the scanner to generate the wobbling superimposes the wobble onto the sensor beam path, and this may influence sensors used in these systems and may affect the accuracy of the weld path determined by the scanner. Beam wobbling may also be achieved using a fast oscillating deflecting mirror, although this may result in extension of the beam path and tends to be rather expensive to implement.

The subject matter claimed herein is not limited to implementations that solve any disadvantages or that operate only in environments such as those described above. Rather, this background is only provided to illustrate one example technology area where some implementations described herein may be practiced.

SUMMARY OF THE DISCLOSURE

A laser processing system according to the present disclosure is used for directing a laser beam from a laser source. The system comprises a collimator including a plurality of lenses. The lenses are positioned along an optical axis from the laser source and are configured to collimate the laser beam to an exit diameter exiting the collimator. At least one of the lenses is movable non-longitudinally relative to the optical axis to induce a deflection in a beam path of the laser beam relative to the optical axis. At least one of the lenses is configured to image the laser beam therefrom with a beam diameter smaller than the exit beam diameter. In other words, at least one of the lenses is exposed to a smaller beam diameter compared to the exit beam diameter. The non-longitudinally movable lens and the smaller beam diameter imaging lens can be the same or different lenses. Also, at least one of the lenses can be movable longitudinally relative to the optical axis to produce zoom functionality.

A laser processing head according to the present disclosure is used for directing a laser beam from a laser source. The head comprises: a collimator, at least one actuator, and a control. The collimator has a plurality of lenses, which are positioned along an optical axis for the laser beam and are configured to collimate the laser beam from the laser source. At least one of the lenses is movable non-longitudinally relative to the optical axis, and the at least one actuator is actuatable to move the at least one non-longitudinally movable lens relative to the optical axis. The at least one non-longitudinally movable lens moved by the at least one actuator is configured to induce a deflection in a beam path of the laser beam relative to the optical axis. The control is in communication with the at least one actuator and is operable to actuate the at least one actuator.

A method disclosed herein is used to direct a laser beam. The method comprises: collimating the laser beam through a collimator having a plurality of lenses; imaging the laser beam through at least one of the lenses of the collimator being exposed to a smaller beam diameter compared to an exit beam diameter of the laser beam exiting the collimator; deflecting a beam path of the laser beam relative to the optical axis by moving at least one of the lenses of the collimator configured to move non-longitudinally relative to the optical axis; and focusing the laser beam from the collimator to a focal point deflected transversely by the deflected path.

The foregoing summary is not intended to summarize each potential embodiment or every aspect of the present disclosure.

DETAILED DESCRIPTION OF THE DISCLOSURE

The present disclosure generally relates to optical systems and related techniques for use of the same. More particularly, but not exclusively, the present disclosure relates to systems and methods for inducing wobbling into a laser beam. In one aspect, the optical systems disclosed herein may be used in connection with laser cutting a component, laser machining a component, additive manufacturing, or laser welding or otherwise joining two or more components with a laser, amongst other variations. Although the embodiments are described in the context of laser beam wobbling which may be used in these processes, it will be appreciated that embodiments disclosed herein may be employed in other fields and/or operating environments where the functionality disclosed herein may be useful. Accordingly, the scope of the invention should not be construed to be limited to the exemplary implementations and operating environments disclosed herein.

Figure 1A:
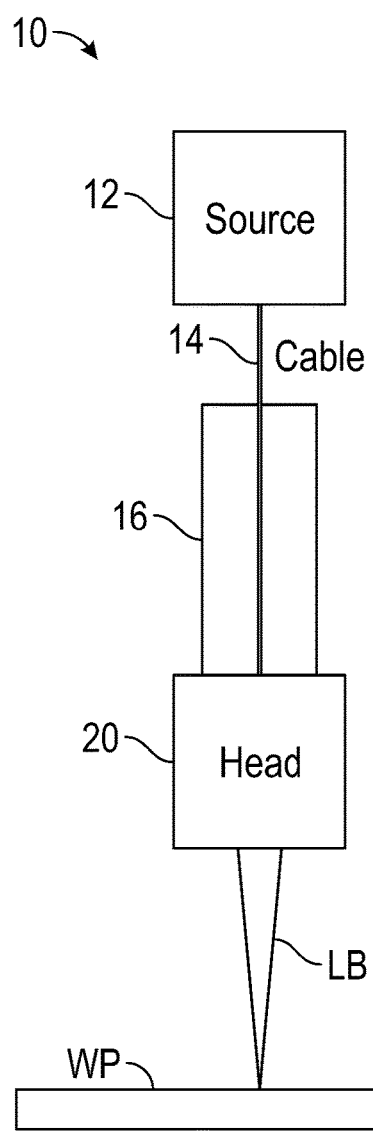
FIG. 1A illustrates a laser delivery system according to the present disclosure.

FIG. 1A illustrates a laser delivery system 10 according to the present disclosure. A laser source 12 generates laser light that propagates along a fiber optic cable 14 to a laser processing head 20. The laser source 12 can be a multi-mode or a single-mode laser depending on the laser power required.

The laser processing head 20 can be moved relative to a workpiece WP and/or can have the workpiece WP moved relative to it. For example, the laser processing head 20 can be moved by a gantry system, robotic arm, or other apparatus 16 used in the art. Internally, the laser processing head 10 includes optics to focus the laser energy in a laser beam LB to the workpiece WP to achieve cutting, brazing, welding, additive manufacturing, or some other lasing process.

Figure 1B:
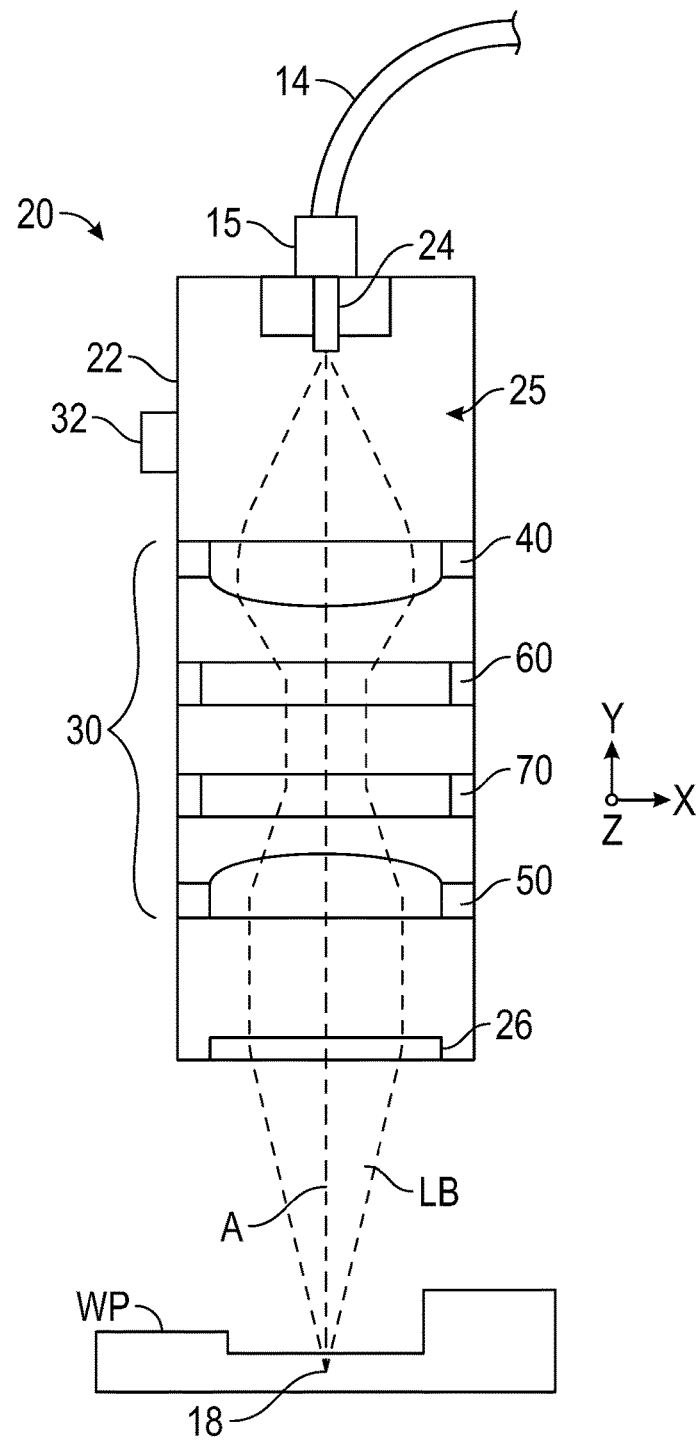
FIG. 1B schematically illustrates a laser processing head according to the present disclosure.

FIG. 1B schematically illustrates a laser processing head 20 according to the present disclosure for use in an optical system 10, such as noted above. The laser processing head 20 includes a housing 22 for internal optics. A receiver 15 at one end of the housing 22 can couple to a laser cable 14, which conducts the laser light into the head 20.

As will be appreciated, collimation of a laser beam can be achieved using a single lens. To provide zoom collimation, a collimator needs only two lenses. Here, the collimator 30 has three lens groups or elements: an input lens element 40, an intermediate lens element 50, 60; and an output lens element 60. Additionally, the intermediate lens element 50, 60 has the highest refractive power in the collimator 30 and is divided into two lenses 50, 60 in the present embodiment. Other arrangements are possible. (Reference to lens, lens element, lens group, etc. may be used interchangeably, but it will be appreciated that any of these referenced herein can be comprised of one or more lens optics—i.e., transmissive optic to focus, disperse, or collimate the laser beam.)

The collimator 30 provides an "optical lever" when collimating the laser beam LB that deflects the path of the laser beam LB relative to the optical axis A (e.g., deflecting the path at an angle) to then induce lateral movement or "wobble" in the focal point 18 beyond focusing optics. This optical lever means that the movement of the focal point 18 is greater than the movement of the lens element(s) that produce the focal point movement. In this way, the collimator 30 does not require a scanner in the head 20 to be moved to produce a "wobble," and only a small movement of collimation lens elements(s) is needed.

During operation, a high power laser delivery fiber 24 emits a high power laser beam LB in the housing 22, where an optical system 25 collimates and focuses the light. For example, the optical system 25 includes a collimator 30 and an output 26. The collimator 30 has a plurality of collimation lenses 40, 50, 60, 70 that collimate the laser beam LB. The output 26 focuses the laser beam LB to a focal point 18 that then impinges on the workpiece WP. As generally shown here in FIG. 1B and noted above, the collimation lenses include outer lenses 40, 50 and inner lenses 60, 70, which are disposed between the outer lenses 40, 50. More details of the collimator 30 are discussed below. The output 26 at the other end of the housing 22 allows a focused laser beam LB to be emitted from the housing 22 for achieving the purposes of the laser process, such as welding, additive manufacture, cutting, etc. The output 26 can include any appropriate focusing optics, nozzle, etc.

The laser processing head 20 is used in a laser machining process in which the path of the laser beam LB is deflected in the X-Y direction perpendicular to the optical axis A through the head 20. The optical axis A may refer to the direction laid out for the beam through the head 20. Here, the optical axis A follows the Z-direction, but it can follow one or more axes depending on any mirrors, reflectors, or the like used in the head 20. The path of the laser beam LB may refer to the beam's propagation direction, which can be varied, angled, deflected, shifted, or the like relative to the optical axis A. As will be appreciated, the deflection of the beam's propagation direction or path can be used for laser cutting, welding, soldering, surface treatment, tactile brazing, additive manufacturing processes, and the like by moving the focal point 18 of the laser beam laterally on a the workpiece WP. In laser additive manufacturing (LAM), for example, the sharply focused projected laser beam LB is used to create a highly localized heat source at the focal point 18 that is rapidly rastered (scanned) to achieve selective laser melting (SLM) of a stock material.

According to the present disclosure, a lateral movement, raster, scan, or wobble of the laser beam LB is achieved using one or more of the collimating lenses 40, 50, 60, and 70 of the collimator 30 in the head 20 to deflect the laser beam. This beam deflection of the collimator 30 can be used more universally across different implementations, from static adjustment to high dynamic beam shaping. The beam deflection of the collimator 30 is integrated into the laser processing head 20 and can be cost-efficient compared to other configurations used for beam deflection.

In one configuration, one or both of the inner lenses 60, 70 in the collimator 30 is able to move non-longitudinally (i.e., shift laterally) relative to an optical axis A for the laser beam LB. In particular, a number of discrete actuators (not shown) having motors or drives can be used to move at least one of the collimating lenses 60, 70 transversely relative to the optical axis A. For example, the actuators can use drives that directly drive solid-state joints, mechanical bearings, or the like that are engaged with portion of the lenses 60, 70.

In another configuration, one or both of the outer lenses 40, 50 in the collimator 30 is able to move non-longitudinally (i.e., tilt at an angle) relative to the optical axis A for the laser beam LB. In particular, a number of discrete actuators (not shown) having motors or drives are used to tilt at least one of the collimating lenses 40, 50 relative to the optical axis A. For example, the actuators can use drives that directly drive solid-state joints, mechanical bearings, or the like that are engaged with portion of the outer lenses 40, 50.

In yet another configuration, the reverse arrangement is possible such that one or both of the inner lenses 60, 70 in the collimator 30 is able to tilt at an angle relative to the optical axis for the laser beam; or one or both of the outer lenses 40, 50 in the collimator 30 is able to shift transversely relative to the optical axis for the laser beam. Finally, any combination of these configurations can be used. Moreover, any one of the lenses 40, 50, 60, 70 (and especially at least one of the outer lenses 40, 50) can move longitudinally along the optical axis to change the focal point 18 and magnification achieved.

Having an understanding of an optical system 25 according to the present disclosure, discussion turns to details of various configurations.

Figure 2:
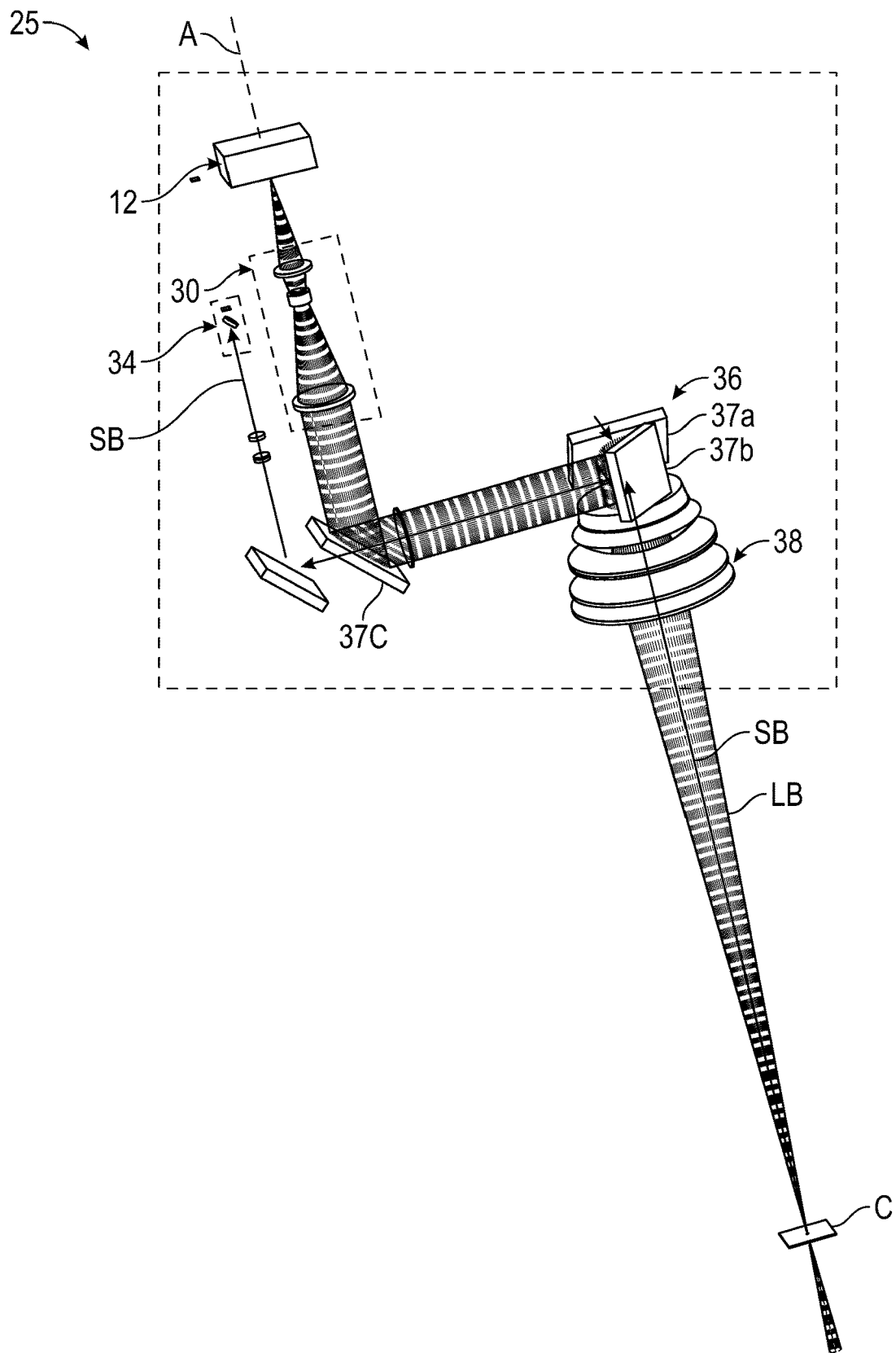
FIG. 2 is a schematic illustration of an optical system relative to a workpiece.

According to one configuration noted above, one or both of the inner lenses 60, 70 in the collimator 30 is able to move or shift transversely relative to an optical axis A for the laser beam LB. Details related to this configuration are discussed with reference to FIGS. 2-3. The optical system 25 for this configuration is schematically illustrated in FIG. 2.

A laser source 12, such as an optical fiber, provides a laser beam LB, which is directed by the optical system 25 to a workpiece or component C. The optical system 25 may be a part of (or used) in a laser welding head (20: FIGS. 1A-1B), or in systems for laser cutting or laser machining a component amongst other possibilities.

In the context of laser welding, for example, the welding head (20) may be a component of a remote welding system which may also include a scanner 36 structured to generate a weld path along a seam between two or more components C and to control movement of the laser beam LB along the weld path. In connection with the optical system 25, for example, a sensor beam SB may move along a sensor beam path in a direction from the component C to a camera or sensor 34 that receives the sensor beam SB for use in generating the weld path. The weld path may also be generated by superposition of a robot path and motion of the scanner 36. The welding head (20) including the optical system 25 may alternatively be a component of a fixed optic welding system where the welding head (20) is mounted to a component such as a robot or gantry (16: FIG. 1) configured to move the welding head (20) relative to the components C being joined.

In the optical system 25, the laser beam LB is provided by a fiber represented by the laser source 12. The laser beam LB passes through the optical system 25 until the beam LB is ultimately directed to the component C. In instances where the laser beam LB is used during a joining process, such as a welding process, between two or more components, the laser beam LB is to be directed on a weld path along a seam between the two or more components C.

The optical system 25 includes a collimator 30 through which the laser beam LB passes. The optical system 25 may also include a number of other components, such as lenses or mirrors, positioned between the laser source 12 and the location where the laser beam LB exits the optical system 25. The collimator 30 (and other components) are used to guide or otherwise manipulate the laser beam LB.

In one form, the optical system 25 may include a fiber cable from the source 12 from which the laser beam LB exits as a beam cone or in a cone shape before entering the collimator 30. The laser beam LB is collimated or, stated alternatively, becomes mostly parallel exiting the collimator 30 and is directed to the scanner 36. As shown, the scanner 36 includes components 37a-b that may be used to direct or move the laser beam LB along a weld path determined by information detected by the sensor 34. An objective lens 38 is positioned behind the scanner 36 along the beam path P of the laser beam LB, and the laser beam LB is passed from the scanner 36 through the objective lens 38 to the component C.

The optical system 25 is configured to induce a wobble into the laser beam LB such that the laser beam LB is moved or oscillated relative to the component C, further details of which will be provided below in connection with FIG. 4. In one form, the collimator 30, illustrated in greater detail in FIG. 3, may be used to induce the wobble into the laser beam LB. As detailed in FIG. 3, the collimator 30 includes a protective glass 31, outer lenses 40 and 50, and inner lenses 60, 70. As the laser beam LB enters the collimator 30, it first passes through the first outer lens 40, then passes through the next inner lens 60, then passes through the other inner lens 70, and then passes through the final outer lens 50 as the laser beam LB exits the collimator 30. In one form, the first outer lens 40 may be a positive lens and the inner lenses 60, 70 may be negative lenses.

As shown, the first input lens 40 can be a positive focal length lens that converges the light rays of the laser beam LB to the smaller diameter of the inner lens 60. In turn, the inner lens 60 can be a negative focal length lens (e.g., a planaconcave lens) arranged to converge the light rays further to the other inner lens 70. For its part, this other inner lens 70 can be a negative focal length lens (e.g., a diverging, bi-concave lens) that diverges the light rays of the laser beam. Finally, the output lens 50 can be a collimating lens that collimates the light rays of the laser beam to an exit diameter $D_E$ for the beam path. In the end, the beam path of the laser beam LB passes onto the other optical components of the system 25, such as reflective mirrors, focusing lens, and the like.

In one form, for example, the first inner lens 60 may have a higher refractive power than that of the other lenses 40, 50 and 70 of the collimator 30, and the first inner lens 60 may also have a higher refractive power than that of other lenses that may be present in the optical system 25. Additionally or alternatively, the other inner lens 70 may have a higher refractive power than that of the other lenses 40, 50 and 60 of the collimator 30, and the other inner lens 70 may also have a higher refractive power than that of other lenses that may be present in the optical system 25. In some forms, the inner lenses 60 and 70 may have the same or substantially same refractive power; their refractive power can be greater than that of the other lenses 40 and 50 of the collimator 30, and they may also have a higher refractive power than that of the other lenses that may be present in the optical system 25.

The laser beam LB is directed from the first outer lens 40 through the inner lenses 60, 70. The collimator 30, which may be a zoom collimator for example, is structured such that the laser beam LB at the first inner lens 60 includes a smaller/reduced beam diameter relative to the exit beam diameter of the laser beam LB exiting the collimator 30 after the last lens 50. The first inner lens 60 is configured to image the laser beam at a smaller beam diameter relative to the exit beam diameter. Stated differently, the first inner lens 60 is exposed to a smaller beam diameter of the laser beam compared to the beam diameter exiting the collimator 30.

In one form, the first outer lens 40 reduces the diameter of the laser beam LB passing therethrough or, stated alternatively, produces a convergence of the laser beam LB. In the illustrated form, the diameters of the inner lenses 60 and 70 are the same, although the diameters of the lenses 60, 70 can be different in other arrangements. The diameters of the inner lenses 60, 70 are less than the diameters of the outer lenses 40, 50. In addition, the diameter of the input lens 40 is less than the diameter of the output lens 50. The laser beam LB exits the inner lens 70 and enters the output lens 50, and the diameter of the laser beam LB as it enters the output lens 50 is greater than the diameter of the laser beam LB exiting the inner lens 70. Similarly, the inner lenses 60, 70 may increase the diameter of the laser beam LB passing through or, stated alternatively, produce a divergence of the laser beam LB.

In the present configuration, the input and output lenses 40, 50 may be stationary lenses; i.e., they do not move relative to the optical axis A for the laser beam LB so that they do not deflect the path of the laser beam LB relative to the optical axis A. Again, the optical axis A may refer to the direction laid out for the beam through the optical system 25. Here, the optical axis A follows the Z-direction through the collimator 30, follows an orthogonal direction from the reflector 37c, and follows the Z-direction from the scanner 36. The path of the laser beam LB may refer to the beam's propagation direction, which can be varied, angled, deflected, shifted, or the like from the optical axis A.

Figure 3:
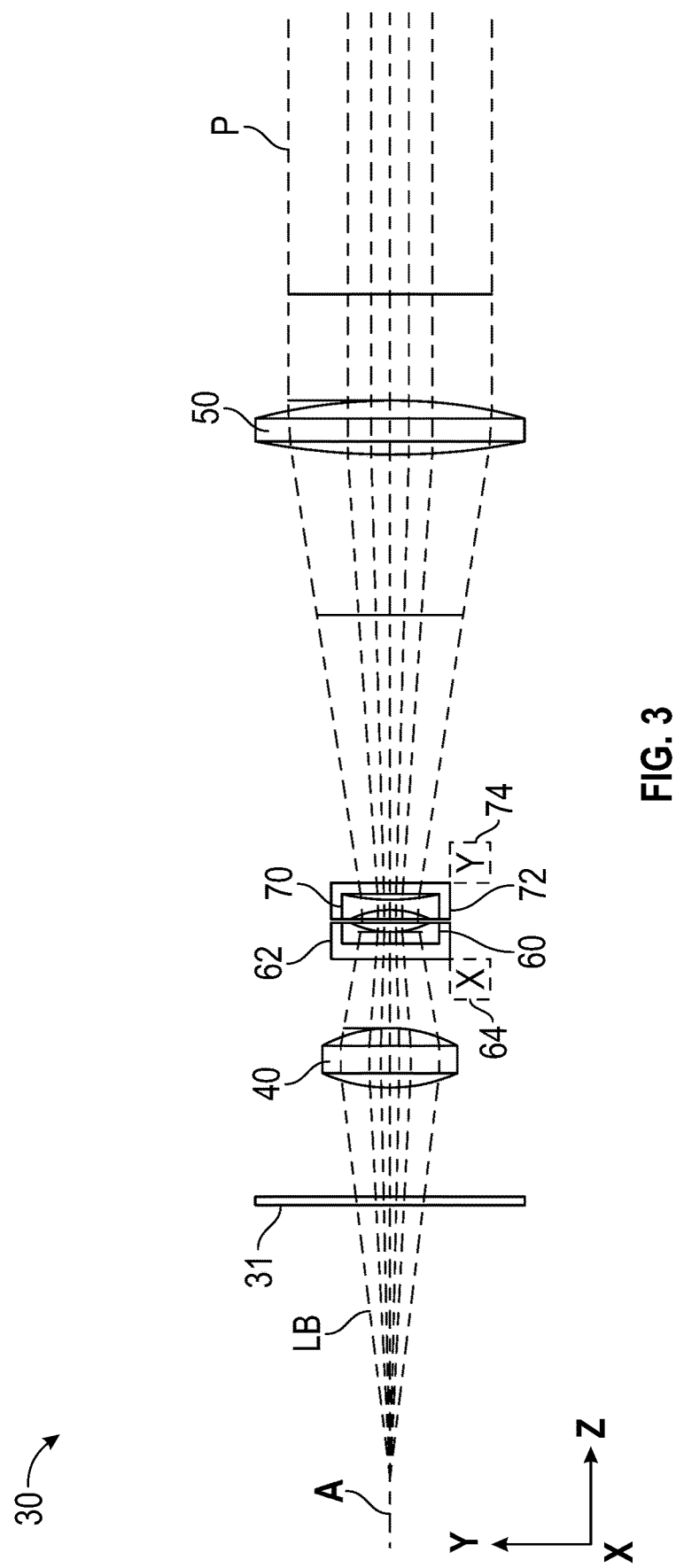
FIG. 3 is a schematic illustration of a collimator of the optical system of FIG. 1.

The second lens 60 is transversely, or more specifically perpendicularly, movable relative to the optical axis A of the laser beam LB along a first axis X which, in FIG. 3, extends perpendicularly to the view plane of the drawing. This deflects (varies, angles, shifts, or the like) the beam path P (the beam's propagation direction) relative to the optical axis A. In one form, for example, the second lens 60, which is optionally positioned in a housing 62 is movable by one or more actuators 64, such as a piezo actuator. Alternatively, the second lens 60 may be positioned in flexure bearings (not shown) and moved by voice coils for the actuators 64.

For its part, the third lens 70 is transversely, or more specifically perpendicularly, movable relative to the optical axis A of the laser beam LB along a second axis Y which, in FIG. 3, extends parallel to the view plane of the drawing. This deflects (varies, angles, shifts, or the like) the beam path P (the beam's propagation direction) relative to the optical axis A. In one form, for example, the third lens 70, which is optionally positioned in a housing 72, is movable by one or more actuators 74, such as a piezo actuator, or the third lens 70 may be positioned in flexure bearings (not shown) and moved by voice coils for the actuators 74. While not specifically mentioned previously, the inner lenses 60, 70 may be moved transversely, and more specifically perpendicularly, relative to one another. Additionally or alternatively, in some forms, both the inner lenses 60, 70 may be moved independently but in the same direction to achieve a larger amplitude of wobbling in the laser beam LB. However, forms where the inner lenses 60, 70 are mechanically coupled and moved together in the same direction in the X-Y plane are also possible.

As indicated above, the collimator 30 when operated in conjunction with the other components of the optical system 25 (i.e., reflectors 37a-c, objective lens 38, and the like) may be used to induce a "wobble" into the laser beam LB. In other words, the collimator 30 when operated in conjunction with the other components of the optical system 25 (i.e., reflectors 37a-c, objective lens 38, and the like) may be used to induce a "wobble" into the laser beam LB. The "wobble" referenced here refers to changes in the lateral position (X and Y-axis) of the laser beam's focal point 18 impinging on a component C. The induced "wobble" results from the collimator 30 deflecting the laser beam's path relative to the optical axis A through the processing head 20. For instance, the collimator 30 can introduce angular deflection of the laser beam LB relative to the optical axis A, which then induces the resulting "wobble" of the focal point 18. Lateral translation of a "thin" lens by a distance offset from the optical axis causes the transmitted light to be deviated by an angle $\Delta\theta$. Accordingly, as disclosed herein, angular deflection of the laser beam's path can be achieved in the collimator 30 by lateral translation of one or both of the inner lens 60, 70 in a plane transverse to the optical axis A to induce at least some of the desired "wobble" of the focal point 18. "Lateral" is transverse or orthogonal to the optical axis A, as opposed to "longitudinal" being along or parallel to the optical axis A.

It may be noted that the desired "wobble" of the focal point 18 may not be induced by simply tilting a "thin" lens in the collimator 30 because the tilt of a "thin" lens would only introduce a small lateral offset of the laser beam LB relative to the optical axis A and would have no significant effect. The movement (lateral translation or tilt) of a "thicker" lens, however, is defined by the principal planes and can be configured to have some effect to induce the desired "wobble." (Reference to "thin" or "thicker" is used here in only a general sense because it would be understood that the effect of tilting a lens depends on a number of additional factors, including the refractive power of the lens, parameters of the light passing through the lens, the type of lens, etc.) In any event, the tilting of a lens can change the plane of sharp focus for transmitted light, which may also have some benefits. Therefore, as disclosed in some embodiments herein, the collimator 30 can induce at least some of the desired "wobble" of the focal point 18 by tilting one or more of the inner lenses 40, 50, 60, 70 relative to the optical axis A, such as by tilting one or more of the outer lenses 40, 50.

More particularly, as one or both of the inner lenses 60, 70 is moved relative to the laser beam LB in the present embodiment, a "wobble" is introduced into the laser beam LB that results in movement of the laser beam LB relative to the component C independent of movement of the laser beam LB by movement of the welding head (20) relative to the component C, movement of the laser beam LB by the scanner 36, movement of the component C relative to the welding head (20), or any combination of these movements.

Figure 4:
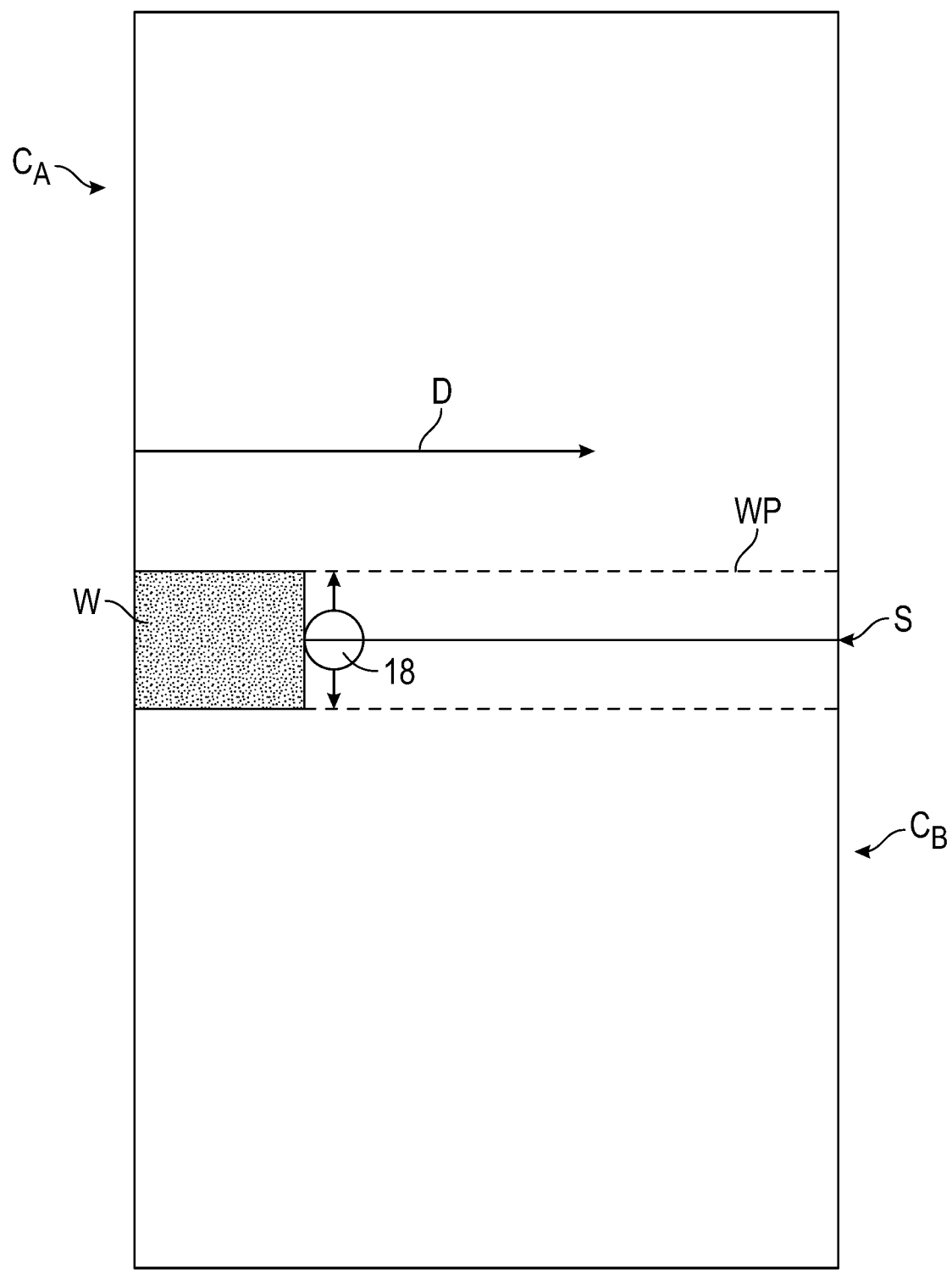
FIG. 4 is a schematic illustration of a weld path produced by the optical system of FIG. 2 relative to a seam between two components.

The wobble or movement of the laser beam LB may be seen in FIG. 4 where a schematic illustration of a welding process for joining a first component $C_A$ and a second component $C_B$ is provided. As shown in FIG. 4 and with references to elements in FIGS. 1A through 3, a welding head 20 including the optical system 25 may be moved in the direction of arrow D along a joint S between the components $C_A$ and $C_B$. In other forms, the laser beam LB may be moved by the scanner 36 in the direction of arrow D while the welding head 20 and the components $C_A$ and $C_B$ remain stationary, or the components $C_A$ and $C_B$ could be moved in a direction opposite of the arrow D while the welding head 20 and the laser beam LB remain stationary such that the laser beam LB passes over the components $C_A$ and $C_B$ in the direction of arrow A. Forms in which a combination of two or more of these actions is utilized to effect movement of the laser beam LB and the components $C_A$ and $C_B$ relative to one another to facilitate joining of the components $C_A$ and $C_B$ along the joint S are also contemplated.

As the welding head 20 is moved in the direction of arrow D, the laser beam LB is also moved in the direction of arrow D. However, due to wobbling induced into the laser beam LB by the collimator 30, the laser beam LB is also moved back and forth between opposite sides of a weld path WP such that the area in the weld path WP covered by the laser beam LB is greater than the diameter of the laser beam LB. The movement may be, but is not limited to, a sinusoidal pattern. This effect may be seen in the welded portion or seam W in FIG. 4. The amplitude of the laser beam LB wobbling or movement relative to the components $C_A$ and $C_B$ may be determined by the extent to which the second lens 60, the third lens 70, or both are moved. For example, if a smaller distance between opposite sides of the weld path WP (i.e., a narrower weld path WP) is desired, then the movement of the second lens 60, the third lens 70, or both may be reduced to reduce the wobble amplitude. Alternatively, if a larger distance between opposite sides of the weld path WP (i.e., a wider weld path WP) is desired, then the movement of the second lens 60, the third lens (70), or both may be increased to increase the wobble amplitude.

The illustration of FIG. 4 is representative of wobbling of the laser beam LB induced by movement of one of the inner lenses 60 or 70, or both the inner lenses 60 and 70 in the same direction such that the movement of the laser beam LB resulting from lens movement in the collimator 30 relative to the components $C_A$ and $C_B$ is in a single plane. In this regard, it should be appreciated that movement of the second lens 60, the third lens 70, or both of the lenses 60, 70 may be determined based on the relative geometry or orientation of the components $C_A$ and $C_B$ being joined together in order to move the laser beam LB in a relevant plane or planes relative to the particular geometry or orientation of the components $C_A$ and $C_B$. For example, if the wobble is being induced by movement of the second lens 60 and the geometry or orientation of the components $C_A$ and $C_B$ changes, then the third lens 70 may be moved in addition to or in lieu of moving the second lens 60 to account for the geometry or orientation change.

In some forms, the inner lenses 60, 70 could be replaced by a single, functionally similar lens that may be moved along both the X and Y axes. Still, in other forms, only one of the inner lenses 60, 70 may be included in the collimator 30, and the laser beam LB may only be moved or wobbled in a single plane relative to the components $C_A$ and $C_B$ by moving the remaining lens. Important parameters for the spot's oscillation include the amplitude of the deflection, the frequency of the oscillation, and the phase between the X and Y components. These parameters can be precisely controlled to create a clean pattern on the workpiece.

While not previously discussed, it should be appreciated that the high refractive power of the inner lenses 60, 70 and thus the smaller beam diameter of the laser beam LB which passes through the inner lenses 60, 70 facilitates smaller movements of the second lens 60, the third lens 70, or both in order to induce the desired wobbling into the laser beam LB relative to forms where the inner lenses 60, 70 do not have high refractive power resulting in the laser beam LB with a reduction in its diameter. In this regard, a small movement of the inner lenses 60, 70 leads to a significantly larger movement of the laser beam LB at a downstream location such as where the laser beam LB interacts with the component. Generally speaking, this configuration results in an "optical lever" that reduces the required movement of the second lens 60 or the third lens 70 necessary to achieve the desired movement of the laser beam LB. As a result, accelerations associated with movement of the inner lenses 60, 70 necessary to induce wobbling are decreased along with vibration recoil on the optical system 25 associated with the accelerations. Moreover, because the diameters of the inner lenses 60, 70 may be reduced given the reduction in the diameter of the laser beam LB, the mass of the inner lenses 60, 70 is reduced which also reduces forces on the optical system 25 associated with movement of these lenses.

With again reference to FIG. 2, for example, it should be appreciated that the movement or wobbling induced into the laser beam LB by the collimator 30 avoids superimposing the wobble onto the sensor beam SB. As a corollary, related influence on the sensor 34 that may affect accuracy in determination of a weld path may be avoided. More specifically, in the optical system 25, the wobbling movement of the laser beam LB by the collimator 30 occurs upstream along the beam path of the laser beam LB of the location where the paths of the laser beam LB and the sensor beam SB are combined. As such, the sensor beam SB is not moved in connection with movement of the laser beam LB.

Without being limited to any particular configuration, and to provide description of one example which may provide the effects discussed above, an example of the optical system for 25 inducing a wobble into the laser beam LB includes the collimator 30 having a focal length of 150-mm, a focusing lens having a focal length of 450-mm, and a laser beam LB having a 37.5 mm raw diameter exiting the collimator 30. The magnification of the system 25 is −3, and the inner lenses 60, 70 have an 18-mm diameter while the laser beam LB passing through these lenses has a 12-mm diameter. The inner lenses 60, 70 have focal lengths of −30-mm and −33-mm, respectively. At a magnification of −3, the motion of the inner lenses 60, 70 together will result in an 8× magnified motion of the laser beam LB on a workpiece. Similarly, for a spot movement of the laser beam LB with an amplitude of 0.4-mm (400-μm) (corresponding to ≥1-mm track width), the inner lenses 60, 70 together only have to be moved by 50 μm. A sinusoidal motion of 50 μm amplitude (100 μm turning point to turning point) at 200 cycles results in an acceleration of 79 m/s$^2$ or 8 g.

In the previous configuration of the optical system 25 and the collimator 30, one or both of the inner lenses 60, 70 is moved transversely to deflect the path P of the laser beam LB relative to the optical axis A to induce the wobble of the laser beam's focal point. In another configuration, the outer lenses 40, 50 are movable to deflect the path P of the laser beam LB relative to the optical axis A to induce at least some of the desired wobble. To do this, one or both of these lenses 40, 50 can be moved non-longitudinally by being tilted at angle(s) relative to the optical axis A.

Figure 5:
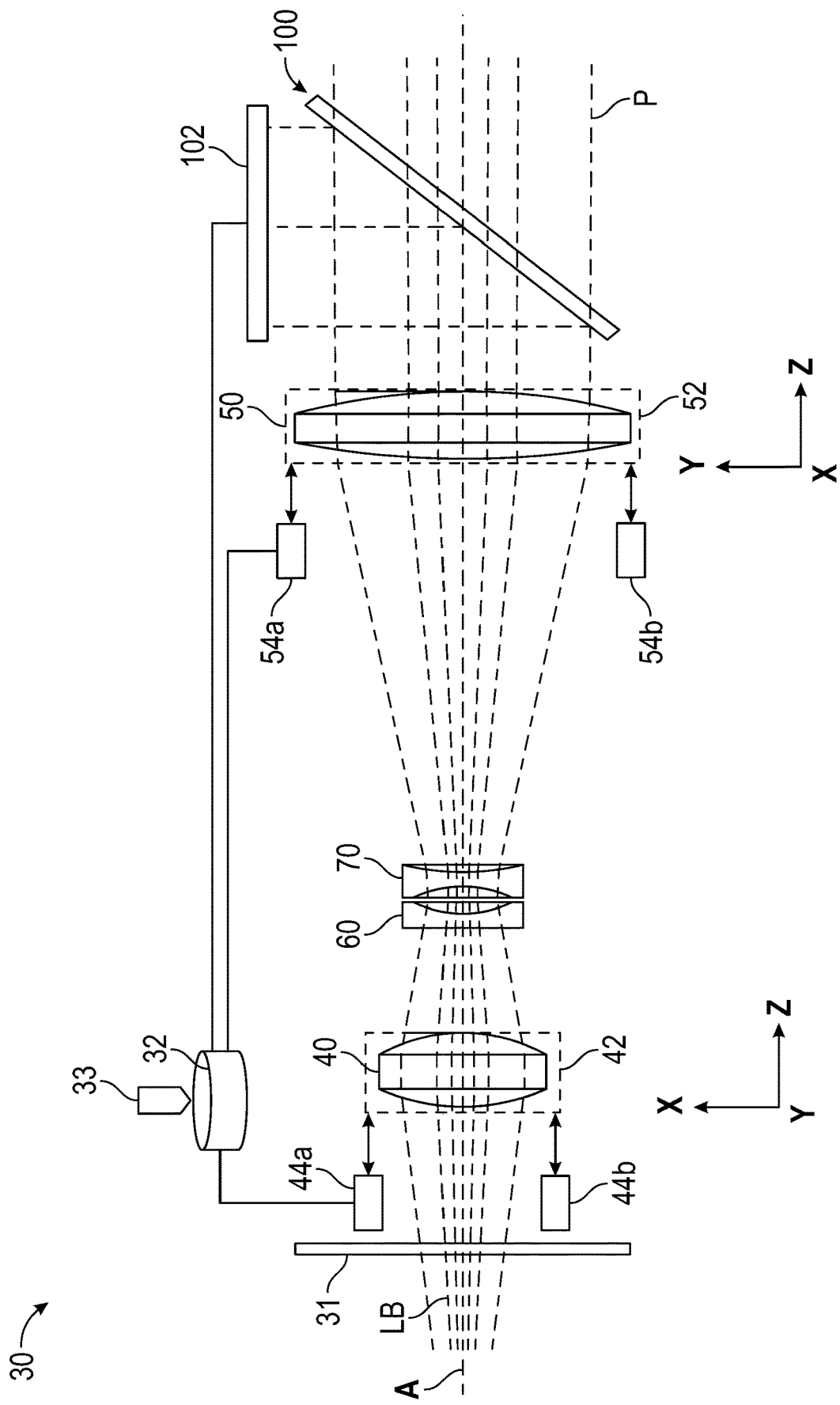
FIG. 5 is a schematic illustration of another collimator of the disclosed optical system.

In particular, FIG. 5 schematically illustrates a collimator 30 of the disclosed optical system. As shown in FIG. 5 and similar to the arrangement in FIG. 3, the collimator 30 includes a protective glass 31, outer lenses 40 and 50, and inner lenses 60 and 70. As the laser beam LB travels through the collimator 30, the beam LB passes successively through the four lenses 40, 60, 70, and 50, which collimate the beam LB before it exits the collimator 30.

The configurations of the lenses can vary. Again similar to the arrangement discussed previously, the first lens 40 can be a positive lens and the inner lens 60, 70 may be negative lenses. The inner lenses 60, 70 can be replaced with one lens (not shown) providing comparable optical power, collimation, etc. The inner lens 60, 70 can have a higher refractive power than that of the other lenses 40 and 50 of the collimator 30, and the inner lenses 60, 70 may have the same or substantially same refractive power. In this configuration, their refractive power is greater than the other lenses 40, 50 of the collimator 30, and they may also have a higher refractive power than the other lenses in the optical system (25). As shown here in FIG. 5, the inner lenses 60, 70 can be stationary. Alternatively, the inner lenses 60, 70 can be movable and can include actuators (64, 74) in a manner comparable to FIG. 3. These and other variations can be used as disclosed herein.

Comparable to the operation discussed previously, the laser beam LB is directed from the first lens 40 through the second lens 60 and then the third lens 70. The collimator 30, which may be a zoom collimator for example, is structured such that the laser beam LB at the second lens 60 includes a smaller beam diameter relative to the exit beam diameter of the laser beam LB exiting the collimator 30 after the fourth lens 50. In that sense, the lens 60 is configured to image the laser beam at a smaller beam diameter relative to the exit beam diameter. Stated differently, the lens 60 is exposed to a smaller beam diameter of the laser beam compared to the beam diameter exiting the collimator 30.

The first lens 40 reduces the diameter of the laser beam LB passing therethrough or, stated alternatively, produces a convergence of the laser beam LB. The diameter of the second lens 60 and the diameter of the third lens 70 are the same, although arranged where the diameters of the second and third lenses 60, 70 are different are also contemplated. The diameters of the second and third lenses 60, 70 are each less than the diameter of the first and fourth lenses 40, 50. In addition, the diameter of the first lens 40 is less than the diameter of the fourth lens 50. The laser beam LB exits the third lens 70 and enters the fourth lens 50, and the diameter of the laser beam LB as it enters the fourth lens 50 is greater than the diameter of the laser beam LB exiting the third lens 70. Similarly, the second lens 60 and the third lens 70 may increase the diameter of the laser beam LB passing through or, stated alternatively, produce a divergence of the laser beam LB.

In one embodiment, the first lens 40 can be tilted at an angle relative to the optical axis A. For example, the first lens 40 can be tilted about a first Y-axis. As an example, the first lens 40 can be positioned in a housing or mount 42, which is movable by one or more actuators 44a-b. Alternative to the tilting of the first lens 40 or in addition to the tilting of the first lens 40, the fourth lens 50 can also be tilted at an angle relative to the optical axis A. For example, the fourth lens 50 can be tilted about a second X-axis. As an example, the fourth lens 50 can be positioned in a housing or mount 52, which is movable by one or more actuators 54a-b.

As can be seen, the lenses 40, 50 may be tilted about two different axes X and Y that are perpendicular relative to one another and are perpendicular to the optical axis A, which lies along the Z axis. Both the lenses 40, 50 may be moved independently but in the same direction to achieve a larger amplitude of wobbling in the laser beam LB. For zoom functionality, one or both of the lenses 40, 50 can be moved longitudinally along with optical axis A so that a change in the Z-position of the focus point relative focusing optics can be achieved in addition to a change in magnification.

As indicated above, the collimator 30 is used to induce a wobble into the laser beam LB. More particularly, as one or both of the lenses 40, 50 is moved relative to the laser beam LB, a wobble is introduced into the laser beam LB that results in movement of the laser beam's focal point 18 relative to workpiece or component (C). This wobble is independent of movement of the laser beam LB produced by movement of the welding head (20) relative to component (C), movement of the laser beam LB by the scanner (36), movement of the component (C) relative to the welding head (20), or any combination of these movements. The wobble or movement of the laser beam LB may be seen in FIG. 4 where a schematic illustration of a welding process for joining a first component $C_A$ and a second component $C_B$ is provided.

As shown in FIG. 5, a controller 32 can receive target movement parameters 33 as input and can send modulated movement signals to the actuators 44a-b, 54a-b. This tilts, shifts, or moves the lenses 40, 50, which will deflect the laser beam LB and/or alter the magnification of the laser beam LB.

To monitor the movement of the laser beam LB, a sensing arrangement can be used. As one example, a partially reflective mirror 100 and a sensor element 102 can provided feedback to the controller 32. Portion of the laser beam from the collimator 30 is reflected by the reflective mirror 100 to the sensor element 102, which measures the position of the beam. The current movement parameters determined by the measured position of the beam is then fed back to the controller 32 so that the target movement parameters 33 can be achieved. This feedback arrangement can monitor and control the movement of the lenses 40, 50 by the actuators 44a-b, 54a-b to achieve the target movement of the beam's focal point.

As disclosed above, it is possible to alter the laser beam LB within the collimation of the collimator 30. For instance, the outer lenses 40 and 50 in the collimator 30 can be moved longitudinally along the optical axis A (i.e., Z-axis) relative to the inner lenses 60, 70 to adjust magnification and longitudinal position of the focal point. In addition to the movement in the Z-direction, the movement of these two outer lenses 40, 50 can be altered about the orthogonal axis X and Y to deflect the path P of the laser beam LB. In one particular configuration, one lens 40 can be tilted about the X-axis, and the other lens 50 can be tilted about the Y-axis. A reverse arrangement can be used. In other configurations, only one of the lenses 40, 50 may be toted relative to a respective axis to achieve at least some of the intended wobble discussed herein, or both lenses 40, 50 can be tilted about the same axis in the same or opposite directions to shape the laser beam LB.

Figure 6:
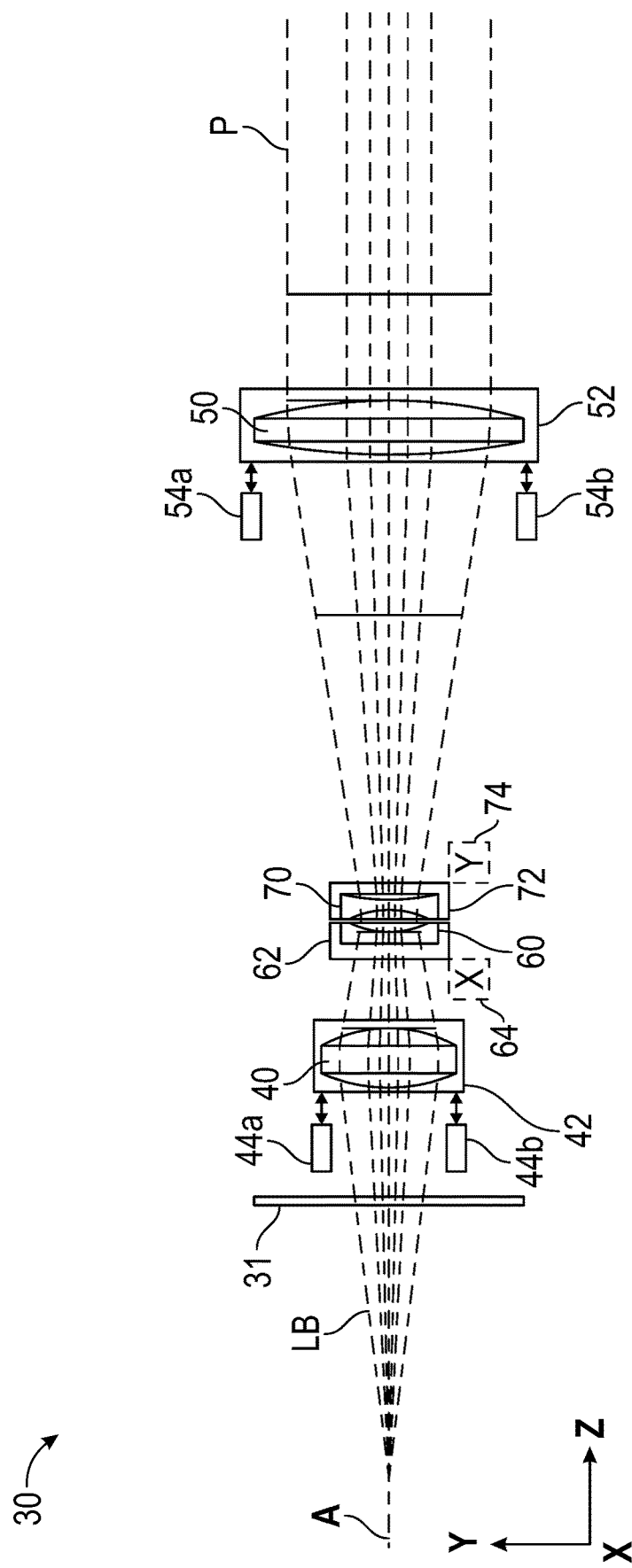
FIG. 6 is a schematic illustration of yet another collimator of the disclosed optical system.

As hinted above, the collimator 30 of the present disclosure can incorporate actuators for moving each of the lenses 40, 50, 60, 70. To that end, FIG. 6 illustrates yet another collimator 30 of the present disclosure. One or both of the outer lenses 40, 50 are movable using actuators 44, 54 (a) longitudinally along the optical axis A to change the magnification of the collimator 30 along the Z axis; and/or (b) non-longitudinally (tiltable relative to the optical axis A) to induce a wobble in the laser beam LB relative to the optical axis A. Moreover, one or both of the inner lenses 40, 50 are movable using actuators 64, 74 non-longitudinally (transverse to the optical axis A) to at least induce a wobble in the laser beam LB relative to the optical axis A.

Figure 7A:
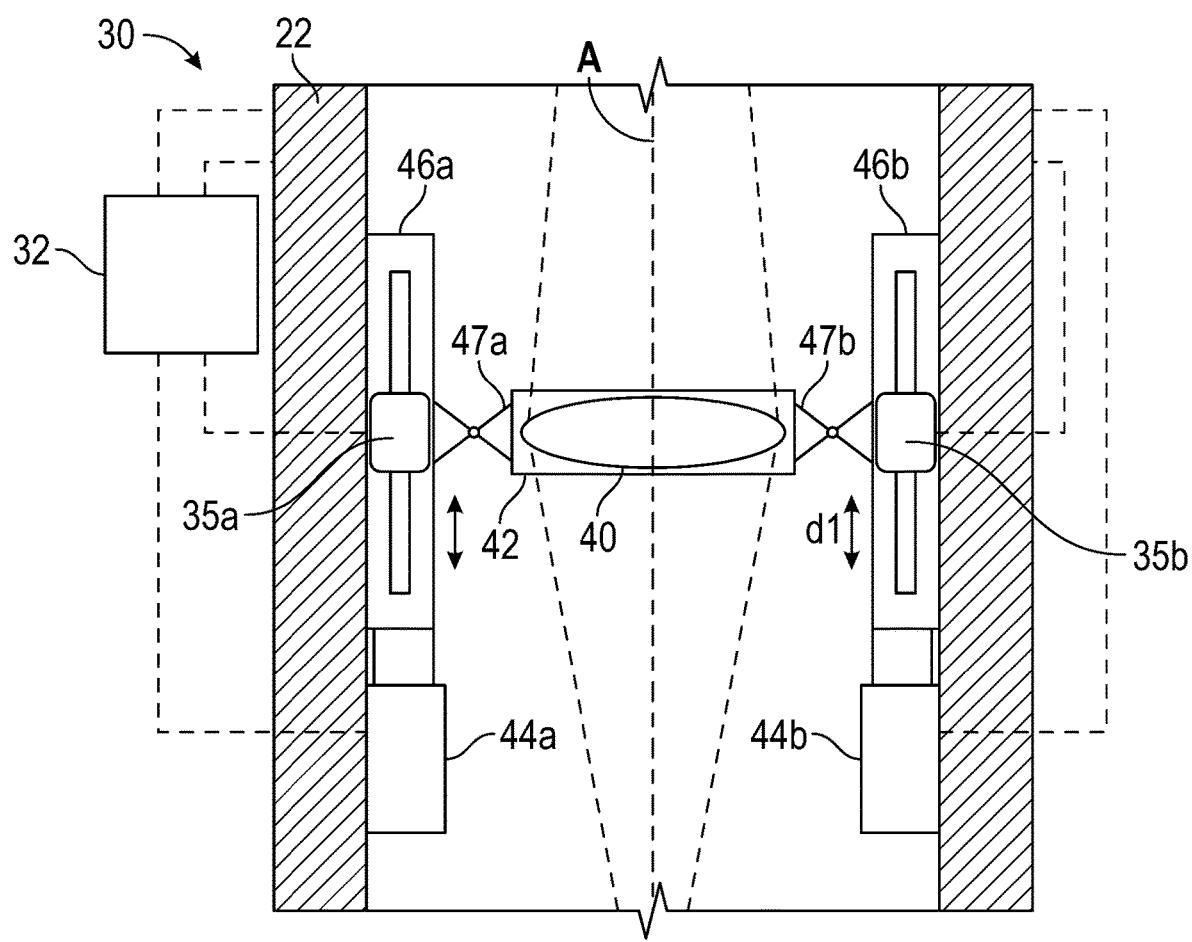
FIGS. 7A-7B illustrate side views of collimator elements in moving the lenses along the optical axis.
Figure 7B:
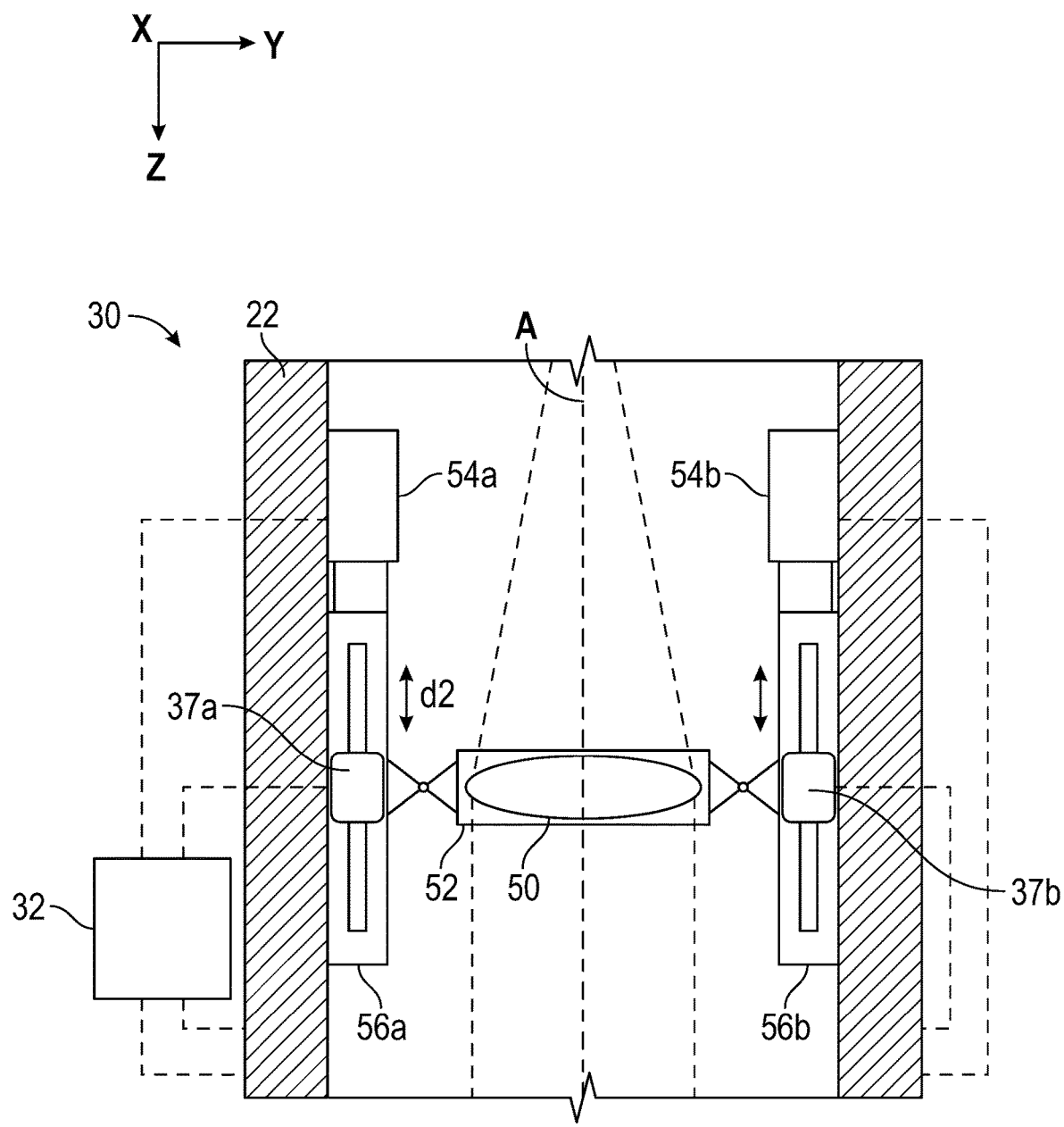

Discussion now turns to details of the actuators 44, 54 for the outer lenses 40, 50. FIGS. 7A-7B illustrate side views of collimator elements used in moving the lenses 40, 50 along the optical axis A. In FIG. 7A, the input lens 40 for the collimator is disposed in a mount 42, which is connected to an articulatable connection (joints 47a-b connected to sliders 46a-b or the like) to the actuators 44a-b. The components can be mounted in (or on) a housing portion 22 of the head (20). In FIG. 7B, the output lens 50 for the collimator is disposed in a mount 52, which is connected to an articulatable connection (joints 57a-b connected to sliders 56a-b or the like) to the actuators 54a-b. The components can mounted in (or on) the housing portion 22 of the head (20). The two configurations in FIGS. 7A-7B may be similar to one another so that discussion of one necessarily describes the other, with exception to any differences in direction or orientation that may be associated with the two configurations.

As shown with reference to FIG. 7A and as applied equally to FIG. 7B, the sliders 46a-b and joints 47a-b can be mounted on opposing sides of the lens 40 and mount 44. In general, only one actuator 44a and slider 46a may be used with a joint 47a at one portion of the mount 42, while another portion of the mount 42 can be connected to the housing portion 22 with a joint 47b fixed thereto. This would allow for at least tilting of the lens 40. Here, however, the lens 40 is arranged to move along the axis A so that at least two actuators 44a-b operated together can move the sliders 46a-b on opposing sides of the lens 40. Both actuators 44a-b operated together can move the slider "up" or "down" along the axis A in unison by some desired distance d1. This movement changes the distance of the lens 40 relative to other elements of the optical system (25: FIG. 2), such as changing the distance of the lens 40 relative to the laser source (12) and the other collimation lenses (50, 60, 70).

The sliders 46a-b have sensors 35a-b connected to a controller 32 of the collimator. These sensor 35a-b can sense the linear movement of the sliders 46a-b moved by the actuators 44a-b, and the sensed movement can be feedback to the controller 32 to coordinate the operation of the actuators 44a-b and achieve the desired movement.

The actuators 44a-b can use drives of a piezoelectric element, a solenoid, an electromagnetic coil, and an electric motor. Additionally, the actuator 44a-b can use one or more bearings/joints 47a-b, such as mechanical bearings, flexure bearings, solid-state joints, or the like.

The configuration in FIG. 7B of lens 50, mount 52, joints 57a-b, sliders 56a-b, actuators 54a-b, etc. can be comparable to the configuration in FIG. 7A. Both actuators 54a-b operated together can move the lens 40 "up" or "down" along the axis A in unison by some desired distance d2. This movement changes the distance of the lens 50 relative to other elements of the optical system (25: FIG. 2), such as changing the distance of the lens 50 relative to the laser source (12) and the other collimation lenses (40, 60, 70).

The disclosed collimator (30) can have either one or both of the configurations in FIGS. 7A-7B. Moreover, the disclosed collimator (30) can operates either one or both of the configurations in FIGS. 7A-7B together or separately to achieve the purposes of shaping the laser beam disclosed herein, such as adjusting the magnification. Moreover, should the disclosed collimator (30) also include configurations to induce wobble using the inner lenses (60, 70) disclosed herein, operation of either one or both of the configurations in FIGS. 7A-7B can be used along with the movement of the inner lenses (60, 70) to induce wobble to shape the laser beam for the purposes disclosed herein.

Figure 8A:
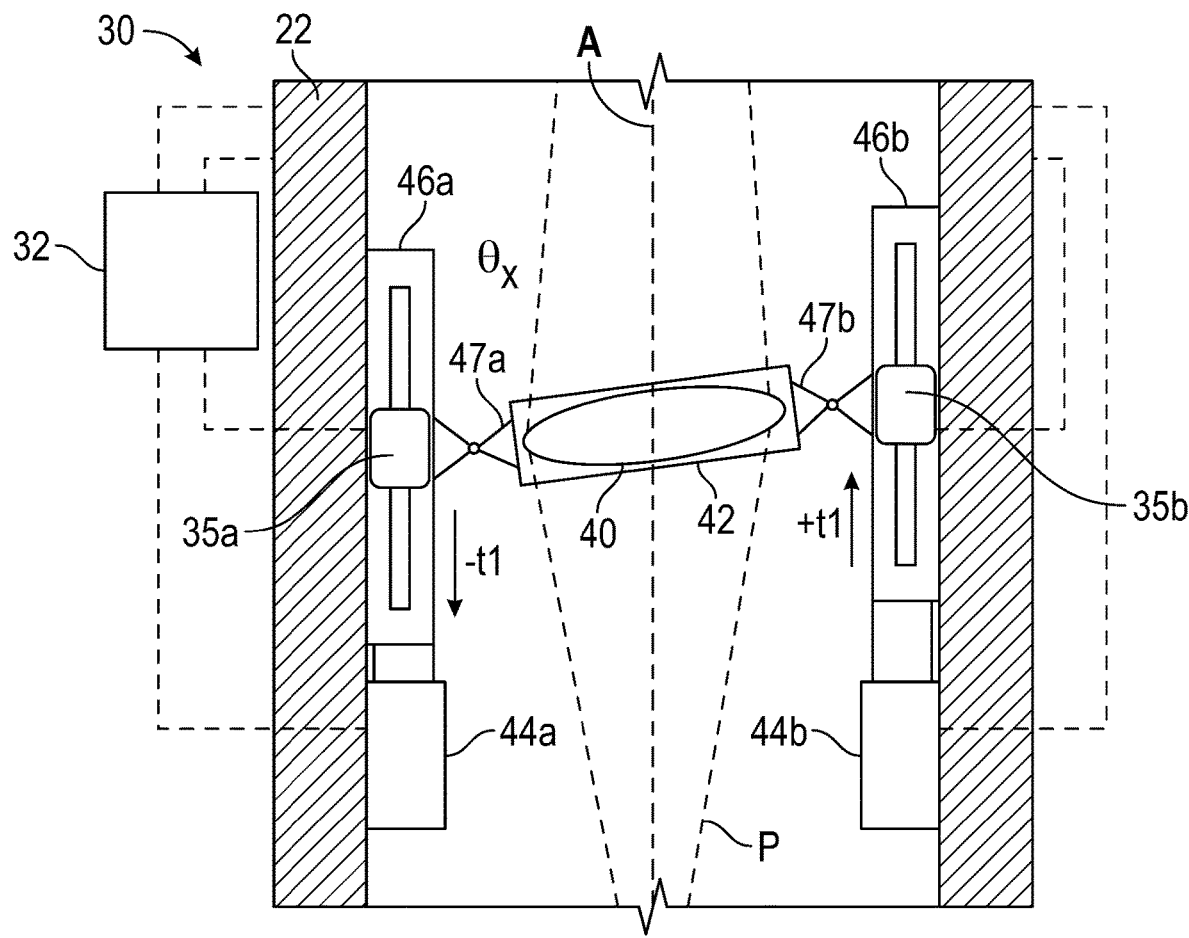
FIG. 8A-8B illustrate side views of the collimator elements in tilting the lenses relative to the optical axis.
Figure 8B:
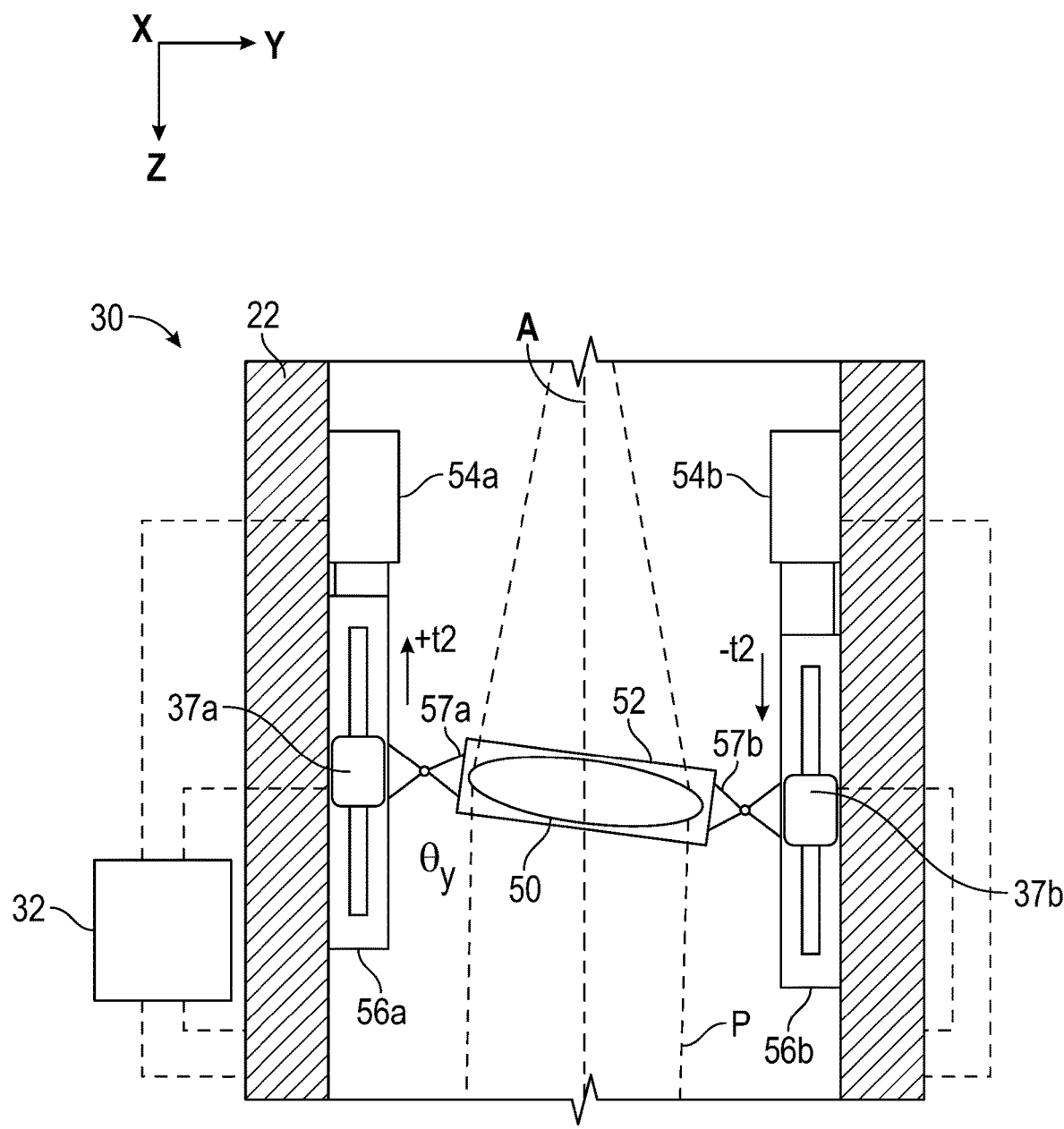

Continuing with the discussion, FIGS. 8A-8B illustrate side views of the collimator elements used in tilting the lenses 40, 50 relative the optical axis A.

As shown with reference to FIG. 8A and as applied equally to FIG. 8B, the sliders 46a-b and joints 47a-b can be mounted on opposing sides of the lens 40 and mount 44. In general, only one actuator 44a and slider 46a may be used with a joint 47a at one portion of the mount 42, while another portion of the mount 42 can be connected to the housing portion 22 with a joint 47b fixed thereto. This would allow for at least tilting of the lens 40. Here, however, the lens 40 is arranged to move along the axis A as already noted so that at least two actuators 44a-b can move the sliders 46a-b on opposing sides of the lens 40. One or both of actuators 44a-b operate to tilt the lens 40 relative to the axis A. In this example, both actuators 44a-b operate in unison to move opposing portions of the lens mount 42 desired distances +t1, −t1 in opposite directions. This movement changes the angle ($\theta_x$) of the lens 40 relative to the optical axis A and relative to the other elements of the optical system (25: FIG. 2), such as changing the angle of the lens 40 relative to the laser source (12) and the other collimation lenses (50, 60, 70).

In general, the two distances +t1, −t1 can be the same amount, which can be sensed by the sensors 35a-b and controlled by the controller 32. Other orientations are possible. For example, the two distances +t1, −t1 can be slightly different to achieve a different angle for the lens. Moreover, the two distances +t1, −t1 need not be in opposite directions. Instead, the two distances +t1, −t1 can be in the same direction with one being greater than the other. This would achieve both magnification change of the lens 40 along the axis A as well as tilting of the lens 40 relative to the axis A.

The configuration in FIG. 8B of lens 50, mount 52, joints 57a-b, sliders 56a-b, actuators 54a-b, etc. can be comparable to the configuration in FIG. 8A. Both actuators 54a-b operated together can tilt the lens 50 relative to the axis A. This movement changes the angle ($\theta_y$) of the lens 50 relative to the optical axis A and relative to the other elements of the optical system (25: FIG. 2), such as changing the angle of the lens 50 relative to the laser source (12) and the other collimation lenses (40, 60, 70).

The disclosed collimator (30) can have either one or both of the configurations in FIGS. 8A-8B. Moreover, the disclosed collimator (30) can operate either one or both of the configurations in FIGS. 8A-8B together or separately to achieve the purposes of shaping the laser beam disclosed herein, such as adjusting the magnification. Moreover, should the disclosed collimator (30) also include configurations to induce wobble using the inner lenses (60, 70) disclosed herein, operation of either one or both of the configurations in FIGS. 8A-8B can be used along with the movement of the inner lenses (60, 70) to induce wobble to shape the laser beam for the purposes disclosed herein.

Finally, the two outer lenses 40, 50 can be tilted relative to the same axis (e.g., X-axis). For example, the two lenses 40, 50 can be tilted at opposing angles on the same axis. These opposing angles can be the same or different depending on the desired shaping of the laser beam. Additionally or alternatively, the two outer lenses 40, 50 can be tilted relative to different axes (e.g., X-axis and Y-axis). For example, the two lenses 40, 50 can be tilted at angles on the orthogonal axes. These angles can be the same or different depending on the desired shaping of the laser beam. For example, FIG. 8A shows the first lens 40 tilted at an angle ($\theta_x$) about the X-axis, whereas FIG. 8B shows the first lens 40 tilted at an angle ($\theta_y$) about the Y-axis.

As seen in the configurations discussed above, a collimating lens 40, 50 can symmetrically mounted between two linear motion bearings 46a-b, 56a-b. Two actuators 44a-b, 55a-b (e.g., voice coil motors) are also mounted symmetrically to move portions of the lens 40, 50 along the optical axis A in the Z-direction. The actuators 44a-54a-b are electrically connected in parallel and are controlled by a controller 32 with one output. Position sensors 35a-b are used to produce feedback signals for the controller 32 and are mounted on both sides of the lens 40, 50.

The controller 32 having inputs for the position sensors 35*a-b*, 37*a-b* allows the actuators 44*a-b*, 54*a-b* to be controlled individually. For adjustments in the Z-direction, the actuators 44*a-b*, 54*a-b* are actuated synchronously to move the lens 40, 50 along the optical axis A. To tilt the lens 40, 50, the actuators 44*a-b*, 54*a-b* move the sides of the lens 40, 50 to two different positions (e.g., by operating the actuators 44*a-b*, 54*a-b* in different directions along the optical axis, by operating the actuators 44*a-b*, 54*a-b* in the same direction at different extents along the optical axis, or by operating one actuator 44*a-b*, 54*a-b* and not the other), which creates a toting movement of the lens 40, 50. This makes it possible to direct the laser beam LB in the X- or Y-direction.

To enable this movement of the lens 40, 50, articulatable or flexible connections (joints) 47*a-b* are used between the linear motion bearings 46*a-b* and the lens mount 42, 52. The articulatable connections 47*a-b* can compensate for a change in distance between the mounting points on the linear motion bearings 46*a-b*, 56*a-b*.

In one particular example, the two lenses 40, 50 can be tilted around a point that is 1-mm away from the center of the lens 40, 50 in the Z-direction. In this example, a rotation of 1° of the first lens 40 can achieve a 113-μm offset of the focal point of the laser beam LB on the workpiece C along one axis, and a rotation of 1° of second lens 50 can achieve 159-μm offset of the focal point of the laser beam LB on the workpiece C along another axis. For this, the linear motion bearings 46*a-b* of the first lens 40 may be moved 0.873-mm in opposite directions, and the linear motion bearings 56*a-b* of the other lens 50 may be moved by 1.135-mm.

Figure 9A:
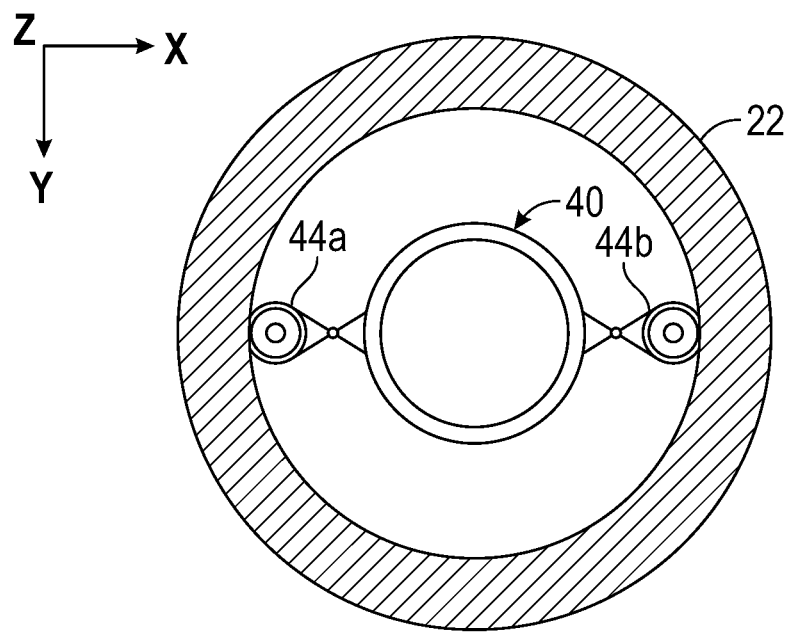
FIG. 9A-9B illustrate plan views of the collimator elements.
Figure 9B:
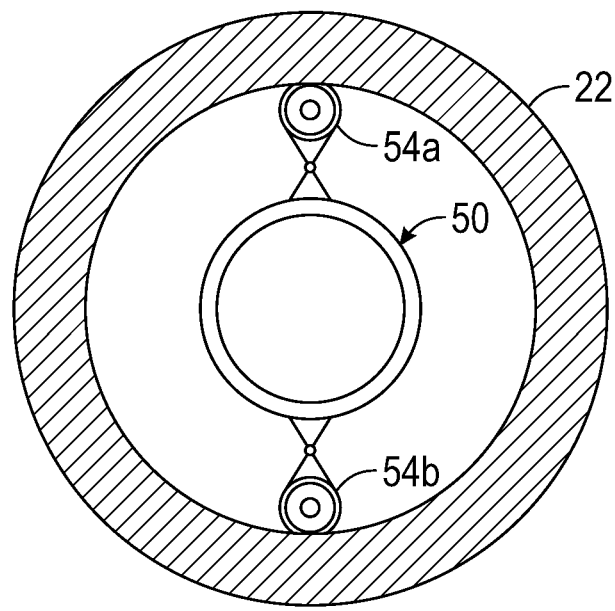

As already noted, opposing pairs of actuators 44*a-b*, 54*a-b* can be used. In the configuration of FIGS. 9A-9B, for example, each lens 40, 50 can uses its own pairs of actuators 44*a-b* and 54*a-b*, one pair for the X-axis and another pair for the Y-axis. As will be appreciated, these and other configurations can be used. The actuators need to be arranged at 180-degrees from one other, as other configurations are possible. If appropriate, each lens 40, 50 can have in general one or more actuators arranged thereabout for changing the placement and orientation of the lens 40, 50. In fact, a give lens 40, 50 can have four actuators at 90-degree intervals, which would allow for tilting about two axes when opposing pairs are actuated and would allow for moving in the Z-direction when all four are actuated in the same direction.

Figure 10:
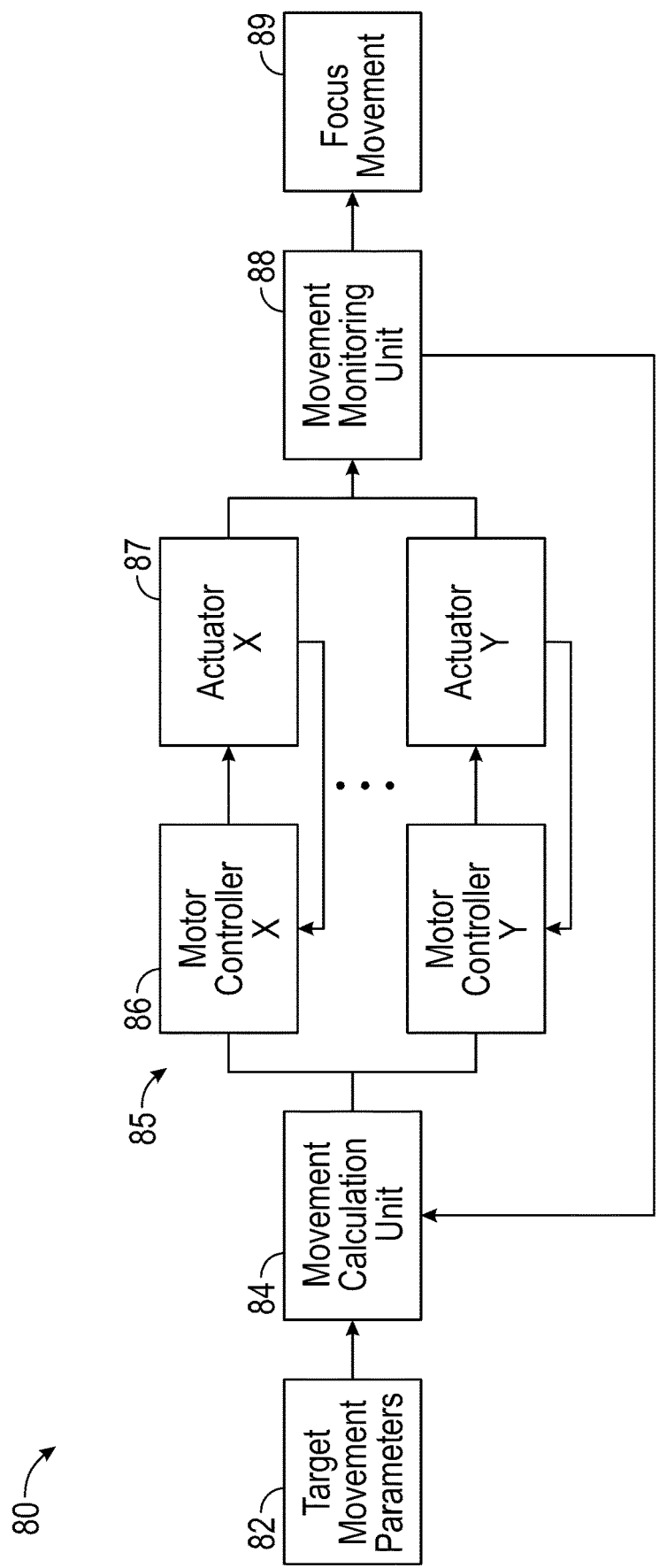
FIG. 10 diagrams a control system for the laser processing head of the present disclosure.

FIG. 10 illustrates a schematic of a control system 80 for the optical system (25) in the laser processing head (20) of the present disclosure. Target movement parameters 82 are input into a movement calculating unit 84, which calculates the movement to be applied by the actuators 87 for the lenses (40, 50, 60, 70). As noted, at least one actuator 87 can be used to achieve the lateral movement of at least one of the inner lenses (60, 70) in an X-Y plane; and optionally at least two actuators 87 can be used to achieve the respective lateral movement of the inner lenses (60, 70) in the X-Y plane. Likewise as noted, actuators 87 can be used to achieve the longitudinal movement of at least one of the outer lenses (40, 50) in the Z-direction; and optionally actuators 87 can be used to achieve the longitudinal movement of both of the inner lenses (40, 50) in the Z-direction. Moreover, at least one actuator 87 can be used to achieve the tilting movement of at least one of the outer lenses (40, 50); and optionally actuators 87 can be used to achieve the tilting movement of both of the inner lenses (40, 50).

For this reason, the current architecture includes multiple motor or drive controllers 86 and actuators 87. The movement control unit 84 feeds the calculated movements to the respective motor controller 86, which then operates the respective actuator 87 to move the respective lens or portion thereof. The movement monitoring unit 88 then uses a sensing arrangement (e.g., the reflective mirror (102), the sensing element (100), etc.) to monitor the movement of the laser beam. Feedback from the movement monitoring unit 88 to the movement calculation unit 84 can provide the incremental adjustments. In the end, the focal point of the laser beam is moved as desired to meet the target positioning.

Inputs for the control system 80 include frequency, amplitude, shape/pattern and orientation/rotation (e.g., motion vector). Based on the inputs, the control system 80 calculates and executes the movement requirements. The control system 80 monitors the movement/deflection in the various axes and directions, e.g. frequency, waveform and amplitude plus synchronization and phase shift. The monitoring can be direct by monitoring the moving parts, e.g., sliders, joints, etc. Also, the control system's monitoring can be indirect by monitoring the deflection of the laser beam using the sensing arrangement to detect the laser position.

The foregoing description of preferred and other embodiments is not intended to limit or restrict the scope or applicability of the inventive concepts conceived of by the Applicants. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter.

What is claimed is:

1. A laser processing system for directing a laser beam, from a laser source, along a laser machining path at a workpiece, the system comprising:
   a collimator, including a plurality of lenses positioned along an optical axis from the laser source, configured to collimate the laser beam as a collimated laser beam having an exit beam diameter exiting the collimator, the plurality of lenses comprising:
      a non-longitudinally movable lens that is movable non-longitudinally relative to the optical axis to deflect a focal point of the collimated laser beam orthogonal to the laser machining path; and
      a tiltable lens that is tiltable about an axis transverse to the optical axis;
   a sensor arrangement, including:
      a partially reflective mirror, disposed within the collimated laser beam exiting the collimator, that reflects a portion of the collimated laser beam;
      a sensor, outside of the collimated laser beam exiting the collimator and in optical communication with the partially reflective mirror, that measures a position of the collimated laser beam; and
   a controller, in communication with the sensor arrangement, that controls movement of the tiltable lens about the axis transverse to the optical axis to direct the focal point of the collimated laser beam along the laser machining path.

2. The system of claim 1,
   wherein the non-longitudinally movable lens comprises at least two lens optics positioned adjacent to one another, and
   wherein the at least two lens optics are at least one of (i) movably coupled together, (ii) independently movable relative to one another, (iii) transversely movable relative to one another, and (iv) movable in a two-dimensional plane transverse to the optical axis.

3. The system of claim 1, wherein the non-longitudinally movable lens comprises a refractive power that is greater than a refractive power of other of the plurality of lenses.

4. The system of claim 1, wherein the controller is configured to move the tiltable lens longitudinally along the optical axis to adjust magnification and longitudinal position of the focal point.

5. The system of claim 1, wherein the controller receives target movement parameters indicative of the laser machining path at the workpiece.

6. The system of claim 1, wherein:
the plurality of lenses further comprises another tiltable lens that is tiltable about the axis transverse to the optical axis; and
the non-longitudinally movable lens is positioned between the tiltable lens and the another tiltable lens.

7. The system of claim 6, wherein the controller is configured to:
receive target movement parameters indicative of the laser machining path at the workpiece;
receive, from the sensor arrangement, the measured position of the collimated laser beam exiting the collimator; and
control a tilt of the tiltable lens and the another tiltable lens to direct the focal point of the collimated laser beam from the measured position of the collimated laser beam to the laser machining path indicated by the target movement parameters.

8. The system of claim 1, wherein the non-longitudinally movable lens comprises a negative lens.

9. A collimator system for directing a laser beam, from a laser source, along a laser machining path at a workpiece, the system comprising:
a collimator, having a plurality of lenses positioned along an optical axis for the laser beam, configured to collimate the laser beam from the laser source to a collimated laser beam exiting the collimator, the plurality of lenses comprising:
a non-longitudinally movable lens that is movable non-longitudinally relative to the optical axis to deflect a focal point of the collimated laser beam orthogonal to the laser machining path; and
a longitudinally movable lens that is movable (i) longitudinally relative to the optical axis and (ii) about an axis transverse to the optical axis;
a sensor arrangement, configured to measure a position of the collimated laser beam, comprising:
a partially reflective mirror, disposed within the collimated laser beam exiting the collimator, that reflects a portion of the collimated laser beam; and
a sensor that receives the reflected portion of the collimated laser beam and measures the position of the collimated beam;
at least one actuator being actuatable to move the longitudinally movable lens relative to the optical axis to (i) induce deflection of the focal point of the collimated laser beam relative to the optical axis, and (ii) shape the collimated laser beam; and
a controller, in communication with the sensor arrangement and the at least one actuator, operable to actuate the at least one actuator to move the focal point from the position of the collimated laser beam to the laser machining path.

10. The system of claim 9, wherein the non-longitudinally movable lens has a refractive power that is greater than a refractive power of the longitudinally movable lens.

11. The system of claim 10, wherein the at least one actuator has at least one articulatable connection to the longitudinally movable lens, and is actuatable to move a portion of the longitudinally movable lens via the at least one articulatable connection relative to the optical axis and about the axis transverse to the optical axis.

12. The system of claim 9,
wherein the longitudinally movable lens comprises at least two lens optics, and
wherein the non-longitudinally movable lens is disposed between the at least two lens optics.

13. The system of claim 9, wherein the controller receives target movement parameters indicative of the laser machining path at the workpiece.

14. The system of claim 9, wherein the non-longitudinally movable lens comprises a negative lens.

15. The system of claim 9,
wherein the longitudinally movable lens comprises at least two lens optics, and
wherein the at least two lens optics are configured to be tilted (i) both about the axis transverse to the optical axis or (ii) a first of the at least two lens optics about the axis transverse to the optical axis and a second of the at least two lens optics about another axis transverse to the optical axis.

16. The system of claim 15, wherein the controller is configured to:
receive target movement parameters indicative of the laser machining path at the workpiece;
receive, from the sensor arrangement, the measured position of the collimated laser beam exiting the collimator; and
control the tilt of the at least two lens optics to direct the focal point of the collimated laser beam from the measured position of the collimated laser beam to the laser machining path indicated by the target movement parameters.

17. A laser processing system comprising:
a collimator including a plurality of lenses configured to collimate a laser beam from a laser source as a collimated laser beam, each of the plurality of lenses being positioned along an optical axis from the laser source;
a sensor arrangement configured to measure movement parameters of the collimated laser beam, the sensor arrangement including a partially reflective mirror disposed within the collimated laser beam exiting the collimator, wherein a portion of the laser beam from the collimator is reflected by the partially reflective mirror to a sensor that measures the position of the beam,
wherein the plurality of lenses includes at least one non-longitudinally movable lens movable non-longitudinally relative to the optical axis and at least one longitudinally movable lens movable (i) longitudinally relative to the optical axis and (ii) about an axis transverse to the optical axis, the plurality of lenses being movable to direct a focal point of the collimated laser beam along a laser machining path at a workpiece and deflect the focal point of the collimated laser beam orthogonal to the laser machining path,
wherein the laser beam entering the non-longitudinally movable lens is a convergent laser beam, and
wherein the laser beam entering the longitudinally movable lens is a divergent laser beam.

18. The system of claim 17,
wherein the longitudinally movable lens comprises at least two lens optics, and wherein the non-longitudinally movable lens is disposed between the at least two lens optics.

19. The system of claim 17, wherein the non-longitudinally movable lens comprises a negative lens.

20. The system of claim 17, comprising:
at least one actuator being actuatable to move the longitudinally movable lens relative to the optical axis to (i) induce deflection of the focal point of the collimated laser beam relative to the optical axis, and (ii) shape the collimated laser beam; and
a controller, in communication with the sensor arrangement and the at least one actuator, operable to actuate the at least one actuator to move the focal point from the position of the collimated laser beam to the laser machining path.

* * * * *